US011434360B2

United States Patent
Nomura

(10) Patent No.: US 11,434,360 B2
(45) Date of Patent: Sep. 6, 2022

(54) THERMOPLASTIC RESIN COMPOSITION HAVING REDUCED IMPACT NOISE AND MOLDED BODY HAVING REDUCED IMPACT NOISE

(71) Applicant: Techno-UMG Co., Ltd., Tokyo (JP)

(72) Inventor: Hiroyuki Nomura, Tokyo (JP)

(73) Assignee: TECHNO-UMG CO., LTD., Tokyo (JP)

( * ) Notice: Subject to any disclaimer, the term of this patent is extended or adjusted under 35 U.S.C. 154(b) by 0 days.

(21) Appl. No.: 16/324,375

(22) PCT Filed: Aug. 8, 2017

(86) PCT No.: PCT/JP2017/028747
§ 371 (c)(1),
(2) Date: Feb. 8, 2019

(87) PCT Pub. No.: WO2018/030398
PCT Pub. Date: Feb. 15, 2018

(65) Prior Publication Data
US 2019/0177531 A1 Jun. 13, 2019

(30) Foreign Application Priority Data
Aug. 9, 2016 (JP) .............................. JP2016-156694

(51) Int. Cl.
| C08L 51/04 | (2006.01) |
| C08L 23/12 | (2006.01) |
| C08L 9/00 | (2006.01) |
| C08L 23/10 | (2006.01) |
| C08L 101/00 | (2006.01) |
| C08L 23/16 | (2006.01) |
| C08L 23/22 | (2006.01) |
| C08L 23/08 | (2006.01) |

(52) U.S. Cl.
CPC .............. *C08L 51/04* (2013.01); *C08L 9/00* (2013.01); *C08L 23/0815* (2013.01); *C08L 23/10* (2013.01); *C08L 23/12* (2013.01); *C08L 23/16* (2013.01); *C08L 23/22* (2013.01); *C08L 101/00* (2013.01); *C08L 2207/04* (2013.01)

(58) Field of Classification Search
CPC ...... C08L 23/0805; C08L 23/22; C08L 23/16; C08L 23/12; C08L 9/00; C08L 23/10; C08L 51/04; C08L 9/06; C08L 9/02; C08L 69/00; C08L 29/06; C08L 101/00; C08L 2207/04; C08L 23/0815
See application file for complete search history.

(56) References Cited

U.S. PATENT DOCUMENTS

| 8,093,336 B2 * | 1/2012 | Jacob et al. ............ C08L 23/16 525/192 |
| 2004/0077791 A1 * | 4/2004 | Issum et al. .......... B29C 66/026 525/185 |
| 2016/0230000 A1 * | 8/2016 | Gu ........................ C08L 53/025 |
| 2018/0290436 A1 * | 10/2018 | Yui et al. ........... B32B 17/10587 |
| 2018/0290437 A1 * | 10/2018 | Kobayashi et al. ........................ B32B 17/10036 |

FOREIGN PATENT DOCUMENTS

| CN | 101268142 A | 9/2008 |
| CN | 101553530 A | 10/2009 |
| CN | 105102533 A | 11/2015 |
| EP | 1956043 A1 | 8/2008 |
| EP | 2085425 A1 | 8/2009 |
| EP | 2418246 A1 | 2/2012 |
| EP | 2610307 A1 | 7/2013 |
| EP | 2985314 A1 | 2/2016 |
| EP | 2990440 A1 | 3/2016 |
| JP | S5776047 A | 5/1982 |
| JP | H09272780 A | 10/1997 |
| JP | H11236481 A | 8/1999 |
| JP | 2011-137066 A | 7/2011 |
| JP | 2011-137067 A | 7/2011 |
| JP | 2011-168186 A | 9/2011 |

(Continued)

OTHER PUBLICATIONS

International Search Report for PCT/JP2017/028747, dated Nov. 14, 2017.
Second Office Action in corresponding Japanese Patent Application No. 2018-533496 dated Nov. 16, 2021.
Third Office Action in corresponding Chinese Patent Application No. 201780053992.3 dated Sep. 27, 2021.
Chen Guang et al., "New Material Overview, 4.3.1 Characteristics and Classification of Rubber," Defense Industry Publishing Company, 2013, pp. 79.
Second Office Action in corresponding Chinese Patent Application No. 201780053992.6 dated May 18, 2021.

(Continued)

*Primary Examiner* — Irina S Zemel
(74) *Attorney, Agent, or Firm* — Lando & Anastasi, LLP

(57) ABSTRACT

A thermoplastic resin composition that can provide molded articles that are not only highly rigid but also inhibited from generating hitting sound is provided, which has a bending modulus of 1850 MPa or higher as measured in accordance with ISO 178 and has a maximum sound pressure value of 2.0 Pa/N or lower as determined over a range of 20-20,000 Hz based on a frequency spectrum of sound pressure obtained by striking the center of one surface of a test piece with a force of 20±5 N using a stainless steel hammer, and collecting a sound generated at this moment using a sound pressure microphone placed at a distance of 12 cm perpendicularly from the above surface, the test piece being an integrally molded article having a rectangular main body that is 120 mm long, 60 mm wide and 3 mm thick and is provided with an upper end thereof with a trapezoidal protrusion that has a 20 mm upper base and a 40 mm lower base, is 8 mm tall and 1.5 mm thick, and being suspended by two strings taped to the protrusion.

16 Claims, 1 Drawing Sheet

(56) References Cited

FOREIGN PATENT DOCUMENTS

| | | |
|---|---|---|
| JP | 2013-040237 A | 2/2013 |
| JP | 2013071982 A | 4/2013 |
| JP | 2015206005 A | 11/2015 |

OTHER PUBLICATIONS

Office Action in corresponding Japanese Patent Application No. 2018-533496 dated May 25, 2021.
First Office Action in Chinese Patent Application No. 201780053992.6 dated Nov. 2, 2020.

\* cited by examiner

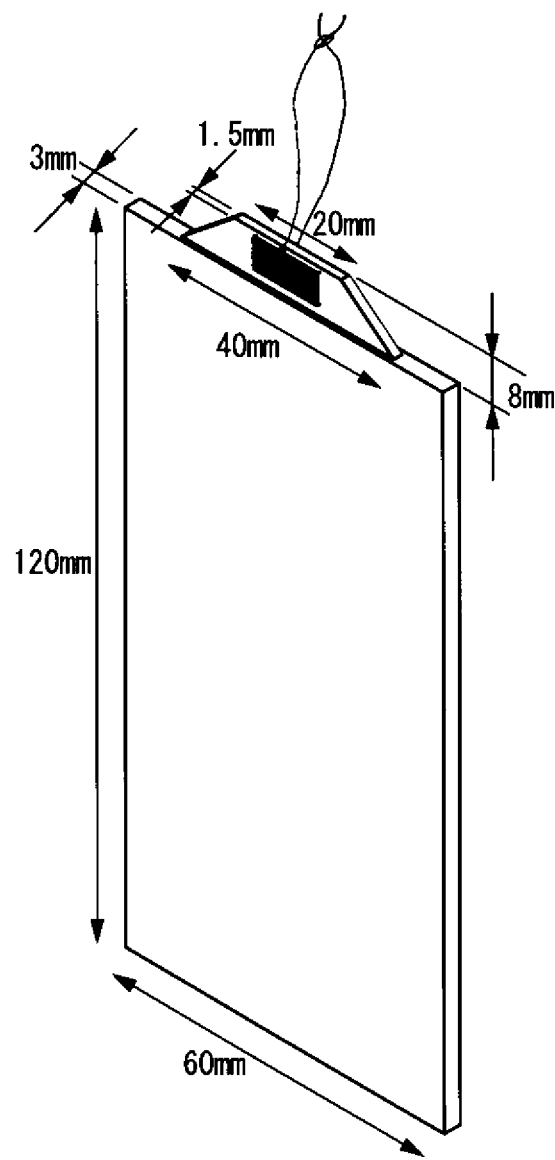

THERMOPLASTIC RESIN COMPOSITION HAVING REDUCED IMPACT NOISE AND MOLDED BODY HAVING REDUCED IMPACT NOISE

CROSS-REFERENCE TO RELATED APPLICATIONS

This application is a U.S. National Phase Application and claims the benefit under 35 U.S.C. § 371 of International Application No. PCT/JP2017/028747, filed Aug. 8, 2017, titled "THERMOPLASTIC RESIN COMPOSITION HAVING REDUCED IMPACT NOISE AND MOLDED BODY HAVING REDUCED IMPACT NOISE," which claims priority to Japanese Application No. 2016-156694, filed on Aug. 9, 2016, the entire contents of which are incorporated herein by reference in their entireties for all purposes.

TECHNICAL FIELD

The present invention relates to a thermoplastic resin composition which can provide a molded body that is not only highly rigid but also inhibited from generating hitting sound.

BACKGROUND ART

Rubber-reinforced resins such as ABS resins are widely used as molding materials for vehicle parts such as automobile interior parts due to excellent mechanical properties, heat resistance, and moldability thereof.

When a vehicle part is molded with a resin, it is further demanded that not only mechanical strength is satisfied at a predetermined level or more, but also a noise generated from the part is decreased to improve quietness of the vehicle, considering comfortability in the vehicle cabin.

Conventionally, automobile interior parts have been molded with a rubber-reinforced resin using an ethylene-α-olefin rubbery polymer as a rubber component in order to prevent squeaking sound generated by the parts contacting together while maintaining mechanical strength at a predetermined level (Patent Literature 1). However, reduction of noise such as hitting sound referred to as a "rattle" remains unsolved.

On the other hand, an elastomeric block polymer is conventionally blended into a flame-retardant rubber-reinforced resin to provide a vibration damping property (Patent Literature 2), but it is only evaluated by a loss factor at a secondary resonance frequency at 25° C. according to a cantilever resonance method, and reduction of noise such as hitting sound has not been studied at all.

CITATION LIST

Patent Literature

Patent Literature 1: Japanese Patent Laid-Open No. 2013-112812
Patent Literature 2: Japanese Patent Laid-Open No. 2001-158841

SUMMARY OF INVENTION

Technical Problem

The present inventor has found that when a resin is improved so as to exhibit rigidity at a predetermined level or more for the purpose of satisfying a mechanical strength required for a vehicle part or the like, hitting sound generated from the resultant resin molded article becomes noticeable.

Accordingly, it is an object of the present invention to provide a thermoplastic resin composition which can provide a molded article that is not only highly rigid but also inhibited from generating hitting sound.

Solution to Problem

The present inventor has studied diligently in order to solve the above problem, and as a result found that the resin molded article can be inhibited from generating the hitting sound and simultaneously can maintain the rigidity at a predetermined level by lowering the maximum sound pressure in a frequency spectrum of hitting sound of a resin molded article or shifting the peak frequency in the frequency spectrum to a lower frequency, leading to the completion of the present invention.

Thus, one aspect of the present invention provides a thermoplastic resin composition which has a bending modulus measured according to ISO 178 of 1850 MPa or more, and a maximum value of sound pressure in a frequency range of 20 to 20,000 Hz of 2.0 Pa/N or less as measured under the following conditions.

Measurement Conditions:

Measurement is performed based on a frequency spectrum of sound pressure obtained by striking a center of one surface of a test piece with a force of 20±5 N using a stainless steel hammer, and collecting a sound generated at this moment by use of a sound pressure microphone placed at a distance of 12 cm from the above surface in a perpendicular direction, the test piece being an integrally molded article having a rectangular main body having a length of 120 mm, a width of 60 mm, and a thickness of 3 mm and provided at an upper end thereof with a trapezoidal protrusion having an upper base of 20 mm, a lower base of 40 mm, a height of 8 mm, and a thickness of 1.5 mm, and being suspended by two strings taped to the protrusion.

As a thermoplastic resin composition that solves the above problem, another aspect of the present invention provides a thermoplastic resin composition comprising a rubber-reinforced resin (A1); and a hitting sound-reducing material (B) selected from a polypropylene resin and a thermoplastic elastomer, wherein the rubber-reinforced resin (A1) comprises a rubbery part (a1) derived from a rubbery polymer, and a resin part (a2) comprising a structural unit derived from an aromatic vinyl monomer, and the rubbery part (a1) comprises a portion derived from an ethylene-α-olefin rubbery polymer.

Still another aspect of the present invention provides a molded body formed of the above thermoplastic resin composition.

Advantageous Effect of Invention

According to the present invention, it has been elucidated that the rigidity of a resin composition and the generation of squeaking sound are not necessarily linked to the generation of hitting sound. Thus, based on this finding, it has been made possible that when the maximum value of sound pressure of hitting sound of a resin molded article in the frequency range of 20 to 20,000 Hz is maintained at 2.0 Pa/N or less, the harsh component of the hitting sound is made unnoticeable while the rigidity of the resin molded article is maintained at a predetermined level or more, and thus the hitting sound is inhibited.

BRIEF DESCRIPTION OF DRAWING

The FIGURE is a perspective view showing the test piece used for measurement of hitting sound in the present invention.

DESCRIPTION OF EMBODIMENTS

The present invention will be described in detail below.

In the present invention, "(co)polymerization" means homopolymerization and/or copolymerization, "(meth)acrylic" means acrylic and/or methacrylic, and "(meth)acrylate" means acrylate and/or methacrylate.

A melting point (sometimes described herein as "Tm") measured according to JIS K 7121-1987 is a value obtained by measuring endothermic changes at a fixed temperature increase rate of 20° C. per minute using a DSC (differential scanning calorimeter), and reading the peak temperature in the obtained endothermic pattern.

1. Thermoplastic Resin Composition (X) of the Present Invention

The thermoplastic resin composition (also referred to herein as a "component (X)") of the present invention is not particularly limited as long as it has a bending modulus of 1850 MPa or more as measured according to ISO 178, and has a maximum value of sound pressure of 2.0 Pa/N or less in the range of 20 to 20,000 Hz as measured under the above conditions.

Examples of the thermoplastic resin composition (X) of the present invention include the thermoplastic resin composition (X) obtained by blending a hitting sound-reducing material (B) into a thermoplastic resin (A) having a bending modulus of 1850 MPa or more as measured according to ISO 178. An example of the thermoplastic resin (A) is a rubber-reinforced resin (A1). Examples of the rubber-reinforced resin include rubber-reinforced aromatic vinyl resins such as ABS resins and AES resins. The rubber-reinforced resin (A1) may be an alloy with another resin (A2). Examples of the another resin (A2) include polycarbonate resins, polyamide resins, polyester resins, vinyl chloride resins, silicone resins, and polylactic acid resins.

As the thermoplastic resin (A), especially preferred is one having a noise risk of 3 or less as measured using a stick-slip tester SSP-02 manufactured by ZINS Ziegler-Instruments GmbH under the following measurement conditions.

Measurement Conditions:

A test piece having a length of 60 mm, a width of 100 mm, and a thickness of 4 mm, and a test piece having a length of 50 mm, a width of 25 mm, and a thickness of 4 mm are provided, and then a surface of the former test piece is rubbed against a surface of the latter test piece three times with a swing of 20 mm at a temperature of 23° C., a humidity of 50% RH, a load of 40 N, and a velocity of 10 mm/s.

The noise risk is an index in accordance with the German Automotive Industry Association (VDA) standards, and indicates, on a scale from 1 to 10, a stick-slip noise generation risk in the case where contact members are made of the same material, and the above noise level of 3 or less is regarded as acceptable.

When not only the thermoplastic resin (A) contained in the thermoplastic resin composition (X) of the present invention, but also the thermoplastic resin composition (X) of the present invention itself exhibits the above noise risk of 3 or less, not only the generation of hitting sound but also the generation of squeaking sound can be inhibited, and therefore a molded article of acoustically high quality can be provided.

The thermoplastic resin composition (X) of the present invention preferably contains the rubber-reinforced resin (A1) from the viewpoint of mechanical properties such as impact resistance, and acoustic properties such as hitting sound and squeaking sound, and the rubber content is preferably 5 to 60% by mass when the whole of the thermoplastic resin composition (X) is 100% by mass. When the thermoplastic resin composition (X) has crystallinity or contains a component having crystallinity, the effect of inhibiting the generation of squeaking sound is better, thereby leading to a preferred embodiment. Specifically, the thermoplastic resin composition (X) preferably has a melting point measured according to JIS K 7121-1987 in the range of 0 to 120° C., more preferably in the range of 10 to 90° C., and still more preferably in the range of 20 to 80° C. As described above, the melting point (Tm) is obtained according to JIS K 7121-1987, and the number of peaks in the endothermic pattern in the range of 0 to 120° C. is not limited to one but may be two or more. The Tm (melting point) seen in the range of 0 to 120° C. may be derived from the rubber-reinforced resin (A1), particularly a rubbery part (a1), or may be derived from an additive described below in connection with the rubber-reinforced resin (A1), for example, a slidability-imparting agent such as a polyolefin wax having a low molecular weight such as a number average molecular weight of 10,000 or less. The slidability-imparting agent may be added to the rubber-reinforced resin (A1) or directly added to the thermoplastic resin composition (X).

The thermoplastic resin composition (X) of the present invention preferably maintains high mechanical strength. Therefore, the thermoplastic resin composition (X) preferably has a deflection temperature under load (1.8 MPa) of 70° C. or more, preferably has a Rockwell hardness of 98 or more, preferably has a tensile strength of 35 MPa or more, and preferably has a bending strength of 45 MPa or more.

1-1. Rubber-Reinforced Resin (A1)

The rubber-reinforced resin (A1) is preferably used as the thermoplastic resin (A) that is the basic resin of the thermoplastic resin composition (X) of the present invention, and preferably used for imparting good mechanical properties and acoustic properties to the thermoplastic resin composition (X) as described above. The rubber-reinforced resin (A1) preferably has crystallinity in order to make better the function of inhibiting the generation of unpleasant sound such as squeaking sound from the above thermoplastic resin composition (X). Specifically, it has a melting point measured according to JIS K 7121-1987 preferably in the range of 0 to 120° C., more preferably in the range of 10 to 90° C., and still more preferably in the range of 20 to 80° C.

As the rubber-reinforced resin (A1), for example, the rubber-reinforced resin (A1) comprising a rubbery part (a1) derived from a rubbery polymer, and a resin part (a2) comprising a constituent unit derived from a vinyl monomer, preferably an aromatic vinyl monomer, can be used. The rubbery part (a1) preferably forms a graft copolymer having the resin part (a2) graft-polymerized therewith. Therefore, the rubber-reinforced resin is preferably composed of at least the above graft copolymer and the resin part (a2) that is not graft-polymerized onto the rubbery part (a1), and may further comprise the rubbery part (a1) onto which the resin part (a2) is not grafted, or other components such as additives The above rubbery part (a1) may be a homopolymer or a copolymer as long as it is rubbery (has rubber elasticity) at 25° C. The above rubbery part (a1) may be composed of either a diene polymer (hereinafter referred to as a "diene rubber") and a non-diene polymer (hereinafter referred to as a "non-diene rubber"). These polymers may be crosslinked polymers or non-crosslinked polymers. Among these, in the present invention, it is preferred that at least part of the above rubbery part (a1) is composed of a diene rubber, in view of impact resistance improvement. In view of the effect of inhibiting unpleasant sounds such as hitting sound and squeaking sound, it is preferred that at least part of the above rubbery part (a1) is composed of a non-diene rubber, and it is particularly preferred that all of the above rubbery part (a1) is composed of a non-diene rubber.

Examples of the non-diene rubber include ethylene-α-olefin rubbers; urethane rubbers; acrylic rubbers; silicone rubbers; silicone-acrylic IPN rubbers; and hydrogenated polymers (having a hydrogenation rate of 50% or more) obtained by hydrogenating (co)polymers comprising structural units derived from conjugated diene compounds. These hydrogenated polymers may be block copolymers or random copolymers.

In the present invention, from the viewpoint of the effect of inhibiting unpleasant sound such as hitting sound and squeaking sound, an ethylene-α-olefin rubber is preferably used as the above non-diene rubber. The ethylene-α-olefin rubber is a copolymer rubber comprising a structural unit derived from ethylene and a structural unit derived from an α-olefin. Examples of the α-olefin include propylene, 1-butene, 1-pentene, 1-hexene, 4-methyl-1-pentene, 1-heptene, 1-octene, 1-decene, 1-dodecene, 1-hexadecene, and 1-eicosene. These α-olefins can be used singly, or in combination of two or more. The number of carbon atoms of the α-olefin is preferably 3 to 20, more preferably 3 to 12, and further preferably 3 to 8 from the viewpoint of impact resistance. The ethylene:α-olefin mass ratio in the ethylene-α-olefin rubber is usually 5 to 95:95 to 5, preferably 50 to 95:50 to 5, and more preferably 60 to 95:40 to 5. When the ethylene:α-olefin mass ratio is in the above range, impact resistance of the obtained molded article is better, thereby resulting in a preferred embodiment. The ethylene-α-olefin rubber may comprise a structural unit derived from a non-conjugated diene, as needed. Examples of the non-conjugated diene include alkenylnorbornenes, cyclic dienes, and aliphatic dienes, and are preferably 5-ethylidene-2-norbornene and dicyclopentadiene. These non-conjugated dienes can be used singly, or as a mixture of two or more. The proportion of the structural unit derived from the non-conjugated diene to the whole of the non-diene rubber is usually 0 to 10% by mass, preferably 0 to 5% by mass, and more preferably 0 to 3% by mass.

In the present invention, as the ethylene-α-olefin rubber, one having a melting point (Tm) of 0 to 120° C. is preferably used. The Tm (melting point) of the ethylene-α-olefin rubber is more preferably 10 to 90° C., still more preferably 20 to 80° C. The fact that the ethylene-α-olefin rubber has a melting point (Tm) means that the rubber has crystallinity. Therefore, using the ethylene-α-olefin rubber having such a melting point (Tm) can allow the above thermoplastic resin composition (X) to exhibit a melting point in the range of 0 to 120° C. and make better the effect of inhibiting unpleasant sound such as hitting sound and squeaking sound. It is considered that when the rubber-reinforced resin (A1) has such crystallinity, occurrence of the stick-slip phenomenon is inhibited, and therefore when a molded article thereof comes into dynamic contact with another article, the generation of unpleasant sound such as squeaking sound is inhibited. The stick-slip phenomenon is disclosed in Japanese Patent Laid-Open No. 2011-174029 and the like.

The Mooney viscosity (ML 1+4, 100° C.; in accordance with JIS K 6300-1) of the ethylene-α-olefin rubber is usually 5 to 80, preferably 10 to 65, and more preferably 10 to 45. When the Mooney viscosity is in the above range, moldability is excellent, and in addition impact strength and appearance of molded articles are better, thereby resulting in a preferred embodiment.

Among the ethylene-α-olefin rubbers, from the viewpoint of the reduction of the generation of unpleasant sound such as hitting sound and squeaking sound, ethylene-α-olefin copolymers containing no non-conjugated diene components are preferred. Among these, ethylene-propylene copolymers, ethylene-1-butene copolymers, and ethylene-1-octene copolymers are further preferred, and ethylene-propylene copolymers are particularly preferred.

The rubbery part (a1) of the rubber-reinforced resin (A1) preferably comprises the above diene rubber in addition to the above non-diene rubber from the viewpoint of mechanical strength such as rigidity. When the above rubbery part (a1) of the rubber-reinforced resin (A1) is composed of the above diene rubber in addition to the non-diene rubber, moldability and impact resistance of the thermoplastic resin composition (X), and appearance of the obtained molded article are more satisfactory.

Examples of the diene rubber include homopolymers such as polybutadiene and polyisoprene; butadiene-based copolymers such as styrene-butadiene copolymers, styrene-butadiene-styrene copolymers, acrylonitrile-styrene-butadiene copolymers, and acrylonitrile-butadiene copolymers; and isoprene-based copolymers such as styrene-isoprene copolymers, styrene-isoprene-styrene copolymers, and acrylonitrile-styrene-isoprene copolymers. These may be random copolymers or block copolymers. These can be used singly, or in combination of two or more. The diene rubbery polymers may be crosslinked polymers or uncrosslinked polymers.

In the present invention, the content of the rubbery part (a1) in the rubber-reinforced resin (A1), that is, the rubber content, is preferably 3 to 80% by mass, more preferably 3 to 75% by mass, further preferably 4 to 70% by mass, further preferably 5 to 70% by mass, and particularly preferably 7 to 65% by mass based on 100% by mass of the whole of the rubber-reinforced resin (A1). When the rubber content is in the above range, impact resistance, the effect of reducing unpleasant sound such as hitting sound and squeaking sound, dimensional stability, moldability, and the like of the thermoplastic resin composition (X) are better, thereby resulting in a preferred embodiment.

The resin part (a2) of the rubber-reinforced resin (A1) comprises a structural unit derived from a vinyl monomer. The vinyl monomer is not particularly limited but preferably comprises an aromatic vinyl compound and may be composed of an aromatic vinyl compound and a compound copolymerizable with the aromatic vinyl compound. Specific examples of the above aromatic vinyl compound include styrene, α-methylstyrene, o-methylstyrene, p-methylstyrene, β-methylstyrene, ethylstyrene, p-tert-butylstyrene, vinyltoluene, vinylxylene, and vinylnaphthalene. These compounds can be used singly, or in combination of two or more. Among these, styrene and α-methylstyrene are preferred.

As the compound copolymerizable with the aromatic vinyl compound, at least one selected from a vinyl cyanide compound and a (meth)acrylate compound can be preferably used, and further, other vinyl monomers copolymerizable with these compounds can also be used as needed. Examples of such other vinyl monomers include maleimide compounds, unsaturated acid anhydrides, carboxyl group-containing unsaturated compounds, hydroxyl group-containing unsaturated compounds, oxazoline group-containing unsaturated compounds, and epoxy group-containing unsaturated compound. These can be used singly, or in combination of two or more.

Specific examples of the above vinyl cyanide compound include acrylonitrile, methacrylonitrile, ethacrylonitrile, α-ethylacrylonitrile, and α-isopropylacrylonitrile. These compounds can be used singly, or in combination of two or more. Among these, acrylonitrile is preferred.

Specific examples of the above (meth)acrylate compound include methyl (meth)acrylate, ethyl (meth)acrylate, n-propyl (meth)acrylate, isopropyl (meth)acrylate, n-butyl (meth)acrylate, isobutyl (meth)acrylate, sec-butyl (meth)acrylate, tert-butyl (meth)acrylate, hexyl (meth)acrylate, n-octyl (meth)acrylate, 2-ethylhexyl (meth)acrylate, cyclohexyl (meth)acrylate, phenyl (meth)acrylate, and benzyl (meth)acrylate. These compounds can be used singly, or in combination of two or more. Among these, methyl methacrylate is preferred.

Specific examples of the above maleimide compounds include N-phenylmaleimide and N-cyclohexylmaleimide. These compounds can be used singly, or in combination of two or more.

Specific examples of the above unsaturated acid anhydrides include maleic anhydride, itaconic anhydride, and citraconic anhydride. These compounds can be used singly, or in combination of two or more.

Specific examples of the above carboxyl group-containing unsaturated compounds include (meth)acrylic acid, ethacrylic acid, maleic acid, fumaric acid, itaconic acid, crotonic acid, and cinnamic acid. These compounds can be used singly, or in combination of two or more.

Specific examples of the above hydroxyl group-containing unsaturated compounds include 3-hydroxy-1-propene, 4-hydroxy-1-butene, cis-4-hydroxy-2-butene, trans-4-hydroxy-2-butene, 3-hydroxy-2-methyl-1-propene, 2-hydroxyethyl (meth)acrylate, 2-hydroxypropyl (meth)acrylate, and 3-hydroxypropyl (meth)acrylate. These compounds can be used singly, or in combination of two or more.

The lower limit value of the content of the structural unit derived from the above aromatic vinyl compound in the rubber-reinforced resin (A1) is preferably 40% by mass, more preferably 50% by mass, and further preferably 60% by mass when the total of the structural unit derived from the aromatic vinyl compound and the structural unit derived from the compound copolymerizable with the aromatic vinyl compound is 100% by mass. The upper limit value is usually 100% by mass.

When the resin part (a2) of the rubber-reinforced resin (A1) comprises, as structural units, structural units derived from an aromatic vinyl compound and a vinyl cyanide compound, the content of the structural unit derived from the aromatic vinyl compound is usually 40 to 90% by mass, preferably 55 to 85% by mass, when the total of both is 100% by mass, and the content of the structural unit derived from the vinyl cyanide compound is 10 to 60% by mass, preferably 15 to 45% by mass, when the total of both is 100% by mass.

The rubber-reinforced resin (A1) can be produced, for example, by graft-polymerizing a vinyl monomer (b) in the presence of a rubbery polymer (a). The polymerization method in this production method is not particularly limited as long as the above graft copolymer is obtained, and may be a known method. The polymerization method can be emulsion polymerization, suspension polymerization, solution polymerization, bulk polymerization, or a polymerization method combining these. In these polymerization methods, a known polymerization initiator, chain transfer agent (molecular weight-adjusting agent), emulsifier, and the like can be appropriately used.

In the above production method, usually, a mixed product of a graft copolymer in which a (co)polymer of vinyl monomers is graft-polymerized onto a rubbery polymer and a (co)polymer of vinyl monomers not graft-polymerized onto the rubbery polymer is obtained. In some cases, the above mixed product may comprise a rubbery polymer onto which the (co)polymer is not graft-polymerized. The rubber-reinforced resin (A1) of the present invention comprises the rubbery part (a1) derived from a rubbery polymer, and the resin part (a2) having a constituent unit derived from a vinyl monomer, and the rubbery part (a1) preferably forms a graft copolymer having the resin part (a2) graft-polymerized therewith, and therefore a mixed product of a graft copolymer and a (co)polymer produced as described above can be used as the rubber-reinforced resin (A1) as it is.

A (co)polymer (A') produced by polymerizing a vinyl monomer in the absence of the rubbery polymer (a) may be added to the rubber-reinforced resin (A1). This (co)polymer (A') constitutes the resin part (a2) not graft-polymerized onto the rubbery part (a1), when added to the rubber-reinforced resin (A1).

As described above, in the rubber-reinforced resin (A1) used in the present invention, the rubbery part (a1) may be a mixture of a non-diene rubber and a diene rubber. The method for producing the rubber-reinforced resin (A1) containing such a plurality of rubbers includes, for example, a method of producing the rubber-reinforced resin (A1) by graft-polymerizing a vinyl monomer (b) in the presence of a rubbery polymer (a) comprising a non-diene rubbery polymer and a diene rubbery polymer, and a method in which a rubber-reinforced resin produced by graft-polymerizing a vinyl monomer (b) in the presence of a non-diene rubbery polymer is mixed with a rubber-reinforced resin produced by graft-polymerizing a vinyl monomer (b) in the presence of a diene rubbery polymer.

The graft ratio of the rubber-reinforced resin (A1) is usually 10 to 150%, preferably 15 to 120%, more preferably 20 to 100%, and particularly preferably 20 to 80%. When the graft ratio of the rubber-reinforced resin (A1) is in the above range, impact resistance of the molded article of the present invention is better.

The graft ratio can be determined by the following equation (1).

$$\text{Graft ratio (\% by mass)} = ((S-T)/T) \times 100 \qquad (1)$$

In the above equation, S is a mass (g) of an insoluble matter obtained by adding 1 g of the rubber-reinforced resin (A1) to 20 ml of acetone, shaking the resultant for 2 hours by a shaker under the temperature condition of 25° C., and thereafter centrifugally separating the resultant for 60 min under the temperature condition of 5° C. into the insoluble matter and a soluble matter by a centrifugal separator (rotation speed: 23,000 rpm); and T is a mass (g) of the rubbery part (a1) contained in 1 g of the rubber-reinforced resin (A1). The mass of the rubbery part (a1) can be acquired by a method of a calculation from a polymerization prescription and a polymerization conversion.

The graft ratio can be regulated, for example, by suitably selecting kind and amount of a chain transfer agent, kind and amount of a polymerization initiator, addition method and addition time of monomers during polymerization, polymerization temperature and others employed in graft polymerization for producing the rubber-reinforced resin (A1).

Limiting viscosity (in methyl ethyl ketone, 30° C.) of the component soluble in acetone (hereinafter, referred as "acetone-soluble matter") of the rubber-reinforced resin (A1) of the thermoplastic resin composition according to the present invention is usually 0.05 to 0.9 dl/g, preferably 0.07 to 0.8 dl/g, and more preferably 0.1 to 0.7 dl/g. When the limiting viscosity is within the above range, impact resistance and moldability of the resin composition become better.

Measurement of the limiting viscosity [η] can be carried out by the following method. First, the acetone-soluble matter of the rubber-reinforced resin (A1) is dissolved in methyl ethyl ketone to make five solutions having different concentrations. From the results of reduced viscosities of the solutions of the respective concentrations measured at 30° C. using an Ubbelohde viscometer, a limiting viscosity [η] is determined. The unit is dl/g.

The limiting viscosity [η] can be regulated, for example, by suitably selecting kind and amount of a chain transfer agent, kind and amount of a polymerization initiator, addition method and addition time of monomers during polymerization, polymerization temperature, polymerization time and others employed in graft polymerization of the rubber-reinforced resin (A1). Alternatively, this regulation may be performed by blending a rubber-reinforced resin (A1) with a (co)polymer (A') having a limiting viscosity [η] that is different from the limiting viscosity [η] of the acetone-soluble matter of the rubber-reinforced resin (A1).

The rubber-reinforced resin (A1) may comprise a slidability-imparting agent and other additives. The slidability-imparting agent not only provides slidability to the thermoplastic resin composition (X) to make easy the assembly of an article comprising the molded article of the present invention, but can provide the effect of inhibiting unpleasant sound such as squeaking sound from being generated from an article comprising the molded article of the present invention during use. Typical examples of the slidability-imparting agent include low molecular weight oxidized polyethylene (c1), ultrahigh molecular weight polyethylene (c2), and polytetrafluoroethylene (c3) as described in Japanese Patent Laid-Open No. 2011-137066, and besides low molecular weight (for example, a number average molecular weight of 10,000 or less) polyolefin waxes and silicone oils.

The above polyolefin wax is preferably a polyethylene wax having a melting point of 0 to 120° C., and the like. When a polyolefin wax having such a melting point or another additive having a melting point of 0 to 120° C. is added to the rubber-reinforced resin (A1), the effect of inhibiting occurrence of unpleasant sound such as squeaking sound can be obtained even if the rubbery part of the rubber-reinforced resin (A1) has no melting point (Tm). These slidability-imparting agents can be used singly, or in combination of two or more. The amount to be added of these slidability-imparting agents is usually 0.1 to 10 parts by mass relative to 100 parts by mass of the rubber-reinforced resin (A1).

Examples of the other additives include antioxidants, ultraviolet absorbents, weather-resistant agents, anti-aging agents, fillers, antistatic agents, flame retardants, antifogging agents, lubricants, antimicrobial agents, fungicides, tackifiers, plasticizers, colorants, graphite, carbon black, carbon nanotubes, and pigments (also including, for example, pigments provided with such functionality as an infrared absorbing or reflecting ability). These may be used singly, or in combination of two or more. The amount to be added of these additives is usually 0.1 to 30 parts by mass relative to 100 parts by mass of the rubber-reinforced resin (A1).

2. Hitting Sound-Reducing Material (B)

The hitting sound-reducing material (B) used in the present invention is not particularly limited as long as it has an effect of lowering the maximum sound pressure of the above thermoplastic resin (A), when blended into the above thermoplastic resin (A). Examples of the hitting sound-reducing material (B) include polypropylene resins and in addition thermoplastic elastomers such as styrene-conjugated diene copolymers. Further, the hitting sound-reducing material (B) preferably has an effect of shifting the frequency (peak frequency) giving the maximum sound pressure to the lower frequency side in the frequency spectrum.

2-1. Polypropylene Resin

Examples of the polypropylene resin that can be used as the hitting sound-reducing material (B) of the present invention include homopolymers of propylene, random or block copolymers which are composed mainly of propylene and further contain ethylene or an α-olefin with not less than 4 carbon atoms as a comonomer, and a mixture of these.

The polypropylene resin has a melt flow rate (MFR) measured at a temperature of 230° C. with a load of 2.16 kg of usually 0.1 to 200 g/10 min, preferably 1 to 150 g/10 min and more preferably 2 to 100 g/10 min, a molecular weight distribution (Mw/Mn) measured by GPC of usually 1.2 to 10, preferably 1.5 to 8 and more preferably 2 to 6, a melting point (Tm) of usually 150 to 180° C. and preferably 165 to 175° C., and a glass transition point (Tg) of usually −10 to 50° C., preferably 0 to 40° C.

Production methods for the polypropylene resin are not particularly limited as long as the above MFR, molecular weight distribution, and melting point are satisfied, but it is usually produced using a Ziegler-Natta (ZN) catalyst or metallocene catalyst.

As a Ziegler-Natta (ZN) catalyst, a highly active catalyst is preferable, and a highly active catalyst composed of a solid catalyst component containing magnesium, titanium, halogen, and an electron donor as essential components in combination with an organic aluminum compound is especially preferred.

As a metallocene catalyst, effective is a catalyst which is composed of a metallocene complex in which an organic compound having a cyclopentadienyl skeleton and a halogen atom are coordinated to a transition metal such as zirconium, hafnium and titanium and is further combined with an alumoxane compound, ion-exchange silicate, an organic aluminum compound or the like.

A comonomer to be copolymerized with propylene includes, for example, ethylene, butene-1, pentene-1, hexene-1, and 4-methyl-pentene-1. The content of these comonomer components is usually 0 to 15% by mass and preferably 0 to 10% by mass relative to 100% by mass of the total amount of the copolymer. Of these, block copolymers of propylene with ethylene and/or butene-1 are preferred, and block copolymers of propylene with ethylene are particularly preferred.

The ratio of the amount of each monomer in the reaction solution does not have to be always constant. Each monomer may be supplied in a constant mixing ratio, or may be supplied in a mixing ratio which is changed with lapse of time. Also, considering copolymer reaction ratio, either of the monomers can be dividedly added.

Any method of polymerization in a manner that allows the catalyst component to efficiently contact each monomer can be employed. Specific examples that can be adopted include a slurry method using an inactive solvent, a bulk method using substantially no inactive solvent but propylene as a solvent, a solution method, and a vapor deposition method using substantially no liquid solvent but keeping each monomer in substantially gaseous form.

In addition, any one of continuous polymerization and batch polymerization may be used. In case of slurry polymerization, as a polymerization solvent, a saturated aliphatic or aromatic hydrocarbon such as hexane, heptane, pentane, cyclohexane, benzene and toluene can be used alone or in combination.

As to polymerization conditions, polymerization temperature is usually −78 to 160° C. and preferably 0 to 150° C., and in this instance, hydrogen can be auxiliary used as a molecular weight regulator. In addition, polymerization pressure is usually 0 to 90 kg/cm²·G, preferably 0 to 60 kg/cm²·G and particularly preferably 1 to 50 kg/cm²·G.

2-2. Thermoplastic Elastomer

Examples of the thermoplastic elastomer that can be used as the hitting sound-reducing material (B) of the present invention include thermoplastic elastomers having a glass transition temperature (Tg) around room temperature, which shows a main dispersion peak of tan δ in the range of −30 to +50° C., or comprises in its molecular structure a polymer portion showing a main dispersion peak of tan δ in the range of −30 to +50° C., thereby exhibiting a high hitting sound reduction effect in the composition of the present invention. Here, when the peak is present only at a temperature lower than −30° C. or conversely a temperature higher than +50° C., no sufficient hitting sound reduction effect is obtained in the usually-employed temperature region, and thus this is not preferred.

As the above thermoplastic elastomer, any can be used as long as it is a polymer that has a main dispersion peak of tan δ in the range of −30 to +50° C. and/or a polymer having in its molecular structure a polymer portion that has a main dispersion peak of tan δ in the range of −30 to +50° C. Examples of those having a main dispersion peak of tan δ in the above temperature range include thermoplastic elastomeric polymers having bulky side chains in a molecular chain. Specific examples of the component (B) include a conjugated diene polymer (portion) in which the content of 1,2-bonds and/or 3,4-bonds (hereinafter also referred to as "vinyl bond content") is high (hereinafter also referred to as "high vinyl"), and an ethylene-α-olefin polymer (portion) having a high α-olefin content. As the component (B) of the present invention, also preferably used are those obtained by polymerizing a monomer component comprising an aromatic vinyl compound or an aromatic vinyl compound and another vinyl monomer copolymerizable with the aromatic vinyl compound in the presence of the polymer that has a main dispersion peak of tan δ in the range of −30° C. to +50° C. and/or the polymer having in its molecular structure the polymer portion that has a main dispersion peak of tan δ in the range of −30° C. to +50° C. described above. Here, as the aromatic vinyl compound and another vinyl monomer, the same ones as described in the description of the above component (A1) are preferably used.

More specific examples of the above thermoplastic elastomer include high vinyl polybutadiene, high vinyl polyisoprene, styrene-butadiene copolymers, styrene-isoprene copolymers, acrylonitrile-high vinyl butadiene copolymers, styrene-acrylonitrile-butadiene copolymers, block copolymers of a styrene-acrylonitrile copolymer (hereinafter also referred to as "AS") block and a high vinyl polybutadiene block, block copolymers of an AS block and a high vinyl polyisoprene block, high vinyl butadiene-(meth)acrylate copolymers, styrene-high vinyl butadiene block copolymers, styrene-high vinyl isoprene block copolymers, hydrogenated styrene-high vinyl butadiene block copolymers, hydrogenated high vinyl butadiene-based polymers, ethylene-α-olefin-based copolymers, and ethylene-α-olefin-polyene copolymers. In addition, the styrene-high vinyl butadiene block copolymers and the styrene-high vinyl isoprene block copolymers include those having structures of an AB type, an ABA type, a taper type, a radial teleblock type or the like. Also included are not only hydrogenated products of the above block copolymers, but also hydrogenated products of block copolymers of a styrene block and a styrene-butadiene random copolymer block, and the like. Further included are graft polymers having the above-mentioned polymer as a main chain onto which styrene blocks or AS blocks are grafted, and graft polymers having a styrene block or AS block as a main chain onto which the above-mentioned polymer is grafted. Specific examples of these graft polymers include polymers in which an AS chain is grafted onto a styrene-high vinyl isoprene block copolymer, and polymers in which a styrene-high vinyl isoprene block is grafted onto an AS copolymer. The above thermoplastic elastomers can be used singly, or in combination of two or more.

The amount to be used of the hitting sound-reducing material (B) used in the thermoplastic resin composition (X) of the present invention is preferably 0.1 to 20% by mass, more preferably 1 to 10% by mass, relative to 100% by mass of the whole of the thermoplastic resin composition (X). When the amount to be used of the hitting sound-reducing material (B) is in the above range, the balance between the hitting sound reduction effect and mechanical strength of the molded article is good.

3. Method for Producing the Thermoplastic Resin Composition (X) of the Present Invention The thermoplastic resin composition (X) according to the present invention can be produced by mixing the respective components in a predetermined blend ratio by a tumbler mixer, a Henschel mixer or the like, and thereafter melt-kneading the mixture using a kneading machine such as a single-screw extruder, a twin-screw extruder, a Banbury mixer, a kneader, a roll and a feeder ruder under proper conditions. A preferable kneading machine is a twin-screw extruder. Further, when the respective components are kneaded, they may be charged in whole so as to be kneaded, or may be charged stepwise or dividedly so as to be kneaded. Also, after kneading in a Banbury mixer, a kneader or the like, pelletization may be performed in an extruder. The melt-kneading temperature is usually 180 to 240° C., preferably 190 to 230° C.

4. Method for Producing the Molded Article of the Present Invention

The molded article of the present invention can be produced by molding the thermoplastic resin composition (X) by a known molding method such as injection molding, press molding, sheet extrusion molding, vacuum molding, profile extrusion molding and foaming molding.

The thermoplastic resin composition (X) of the present invention has excellent properties as described above, and therefore can be used as vehicle interior articles such as meter visors, console boxes, glove boxes, and cup holders; vehicle exterior articles such as front grilles, wheel caps, bumpers, fenders, spoilers, garnishes, door mirrors, radiator grilles, and knobs; lighting appliances such as straight tube type LED lamps, bulb type LED lamps, and bulb type fluorescent lamps; home electric appliances such as cellular phones, tablet terminals, rice cookers, refrigerators, microwave ovens, gas stoves, vacuum cleaners, dishwashers, air cleaners, air conditioners, heaters, TVs, and recorders; office automation equipment such as printers, faxes, copying machines, personal computers, and projectors; acoustic equipment such as audio appliances, organs, and electronic pianos; caps for cosmetic containers; battery cell housings; and the like.

EXAMPLES

The present invention will be more specifically described below by way of Examples, but the present invention is not limited to only the following Examples. In the Examples, parts and % are based on mass unless otherwise noted.

1. Raw Materials [P]

As rubber-reinforced aromatic vinyl resins, those obtained in the following Synthesis Examples 1 and 2 were used.

1-1. Synthesis Example 1 (Synthesis of Raw Material P1 (Diene Rubber-Reinforced Aromatic Vinyl Resin))

A polymerization container equipped with a stirrer was charged with 280 parts of water, 60 parts (solid content) of a polybutadiene latex having a weight average particle diameter of 0.26 μm and a gel fraction of 90%, as a diene rubbery polymer, 0.3 part of sodium formaldehyde sulfoxylate, 0.0025 part of ferrous sulfate, and 0.01 part of disodium ethylenediaminetetraacetate, and was deoxidized and then heated to 60° C. under a nitrogen gas stream with stirring. Then, a monomer mixture comprising 10 parts of acrylonitrile, 30 parts of styrene, 0.2 part of t-dodecyl mercaptan, and 0.3 part of cumene hydroperoxide was continuously added thereto dropwise at 60° C. over 5 hours. After the completion of the dropwise addition, stirring was continued at a polymerization temperature of 65° C. for 1 hour, and then polymerization was terminated to obtain a latex of a graft copolymer. Polymerization conversion rate was 98%. Then, 0.2 part of 2,2'-methylene-bis(4-ethylene-6-t-butylphenol) was added to the obtained latex, and calcium chloride was added thereto for coagulation followed by washing, filtration, and drying steps to obtain a powdery resin composition. The graft ratio of the obtained resin composition was 40%, and the limiting viscosity [η] of the acetone-soluble matter was 0.38 dl/g.

1-2. Synthesis Example 2 (Synthesis of Raw Material P2 (Ethylene-Propylene (EP) Rubber-Reinforced Aromatic Vinyl Resin)

A 20 L-volume stainless steel autoclave equipped with a ribbon stirrer blade, an auxiliary agent-continuous adding device, a thermometer and the like was charged with 22 parts of an ethylene-propylene copolymer (ethylene/propylene=78/22(%), Mooney viscosity (ML 1+4, 100° C.)=20, melting point (Tm)=40° C., glass transition temperature (Tg)=−50° C.) as an ethylene-α-olefin rubbery polymer, 55 parts of styrene, 23 parts of acrylonitrile, 0.5 part of t-dodecyl mercaptan, and 110 parts of toluene, and the internal temperature was increased to 75° C., followed by stirring the contents in the autoclave for 1 hour to obtain a uniform solution. Then, 0.45 part of t-butylperoxyisopropyl monocarbonate was added, and the internal temperature was further increased. After 100° C. was reached, polymerization reaction was performed at a stirring rotation rate of 100 rpm while this temperature was maintained. Four hours after the start of the polymerization reaction, the internal temperature was increased to 120° C., and while this temperature was maintained, the reaction was further performed for 2 hours before the polymerization reaction was terminated. Then, the internal temperature was cooled to 100° C., and 0.2 part of octadecyl-3-(3,5-di-t-butyl-4-hydroxyphenol)-propionate and 0.02 part of dimethyl silicone oil "KF-96-100cSt" (trade name: manufactured by Shin-Etsu Chemical Co., Ltd.) were added. Then, the reaction mixture was taken out of the autoclave, and unreacted matters and solvents were removed therefrom by steam distillation. Further, the resultant was pelletized using an extruder (at a cylinder temperature of 220° C., degree of vacuum of 760 mmHg) equipped with a 40 mmϕ-screw and a vent while volatile components were substantially degassed. The graft ratio of the obtained ethylene-α-olefin rubber-reinforced vinyl resin was 70%, and the limiting viscosity [η] of the acetone-soluble matter was 0.47 dl/g.

2. Raw Materials [Q]

As a thermoplastic resin that did not contain any part derived from the rubbery polymer, the following raw material Q1 was used.

2-1. Raw Material Q1 (AS Resin)

An acrylonitrile-styrene copolymer which had proportions of acrylonitrile units and styrene units of 27% and 73%, respectively, and had a limiting viscosity [η] (at 30° C. in methyl ethyl ketone) of 0.47 dl/g was used. Glass transition temperature (Tg) was 103° C.

2-2. Synthesis Example 3 (Synthesis of Raw Material Q2 (Heat-Resistant AS Resin))

A polymerization container with a stirrer was charged with 250 parts of water and 1.0 part of sodium palmitate, and was deoxidized and then heated to 70° C. under a nitrogen gas stream with stirring. Further, 0.4 part of sodium formaldehyde sulfoxylate, 0.0025 part of ferrous sulfate, and 0.01 part of disodium ethylenediaminetetraacetate were fed thereinto, and then a monomer mixture comprising 70 parts of α-methylstyrene, 25 parts of acrylonitrile, 5 parts of styrene, 0.5 part of t-dodecyl mercaptan, and 0.2 part of cumene hydroperoxide was continuously added thereto dropwise at a polymerization temperature of 70° C. over 7 hours. After the completion of the dropwise addition, stirring was continued for 1 hour at a polymerization temperature of 75° C., and then polymerization was terminated to obtain a latex of a copolymer. Polymerization conversion rate was 99%. Then, the obtained latex was coagulated by adding calcium chloride, followed by washing, filtration, and drying steps to obtain a powdery copolymer. The limiting viscosity [η] of the acetone-soluble matter of the obtained copolymer was 0.40 dl/g.

3. Raw Materials [R]

3-1. Raw Material R1 (PP Resin)

A polypropylene resin "BC6C" (trade name) manufactured by Japan Polypropylene Corporation was used. The glass transition temperature (Tg) was 20° C.

3-2. Raw Material R2 (Thermoplastic Elastomer)

A thermoplastic elastomer (styrene-isoprene-styrene copolymer) "HYBRAR 5127" (trade name) manufactured by KURARAY CO., LTD. was used. The glass transition temperature (Tg) was 20° C.

3. Raw Material [S]

3-1. Raw Material S1 (PC Resin)

A polycarbonate resin "NOVAREX 7022J" (trade name) manufactured by Mitsubishi Engineering-Plastics Corporation was used.

Examples 1 to 4 and Comparative Examples 1 to 2

1. Production of Thermoplastic Resin Composition

The raw materials [P], [Q], [R], and [S] shown in Table 1 were mixed in a blending proportion shown in the same table. And then, the resultant mixture was melt-kneaded at 250° C. using a twin-screw extruder (a model name "TEX44", The Japan Steel Works, LTD.) to obtain pellets. The obtained resin composition was subjected to the following measurement and evaluation. The results are shown in the following Table 1.

2. Melting Point (Tm)

According to JIS K7121-1987, endothermic changes were measured at a fixed temperature increase rate of 20° C. per minute using a DSC (differential scanning calorimeter), and the melting point (Tm) was obtained from the peak temperature in the obtained endothermic pattern.

3. Bending Modulus (Rigidity)

Measurement was performed according to ISO 178.

4. Deflection Temperature Under Load

Measurement was performed under a load condition of 1.8 MPa according to ISO 75.

5. Rockwell Hardness

Measurement was performed according to ISO 2039.

6. Tensile Strength

Measurement was performed according to ISO 527.

7. Bending Strength

Measurement was performed according to ISO 178.

8. Measurement of Sound Pressure of Hitting Sound

A test piece, which was an integrally molded article having a shape having a trapezoidal protrusion having an upper base of 20 mm, a lower base of 40 mm, a height of 8 mm, and a thickness of 1.5 mm at the upper end of a rectangular main body having a length of 120 mm, a width of 60 mm, and a thickness of 3 mm as shown in the FIGURE, was injection-molded by an injection molding machine IS-170FA manufactured by TOSHIBA MACHINE CO., LTD at a cylinder temperature of 250° C., an injection pressure of 50 MPa, and a mold temperature of 60° C. using each thermoplastic resin composition. Then, in a state in which the test piece was suspended by two strings taped to the protrusion of the test piece, the center of one surface of the test piece was struck with a force of 20±5 N using a stainless steel hammer "086CO3" (trade name) manufactured by PCB Piezotronics, Inc. capable of measuring a striking force, and the sound generated at this moment was collected by use of a sound pressure microphone "378B02" (trade name) manufactured by PCB Piezotronics, Inc. placed at a distance of 12 cm perpendicularly from the above surface, and converted into a frequency spectrum of sound pressure by a Fourier transform analyzer "Multi JOB FFT Analyzer OR34J-4" (trade name) manufactured by OROS. The maximum value of sound pressure (Pa/N) and its frequency (Hz) in the obtained frequency spectrum were used as measured values. The measurement was performed in a room at a room temperature of 23° C. The sound pressure (Pa/N) obtained as a measured value means the sound pressure per 1 N of the measured striking force.

9. Attenuation of Hitting Sound

The same operation as the measurement of sound pressure of hitting sound was performed, and temporal changes in sound pressure were measured by a Fourier transform analyzer "Multi JOB FFT Analyzer OR34J-4" (trade name) manufactured by OROS. The time required from the generation of a sound until the sound pressure decreased to ¼ of the maximum sound pressure was used as hitting sound attenuation time.

10. Squeaking Sound Evaluation (Noise Risk)

Each thermoplastic resin composition was injection-molded by an injection molding machine "IS-170FA" manufactured by TOSHIBA MACHINE CO., LTD. at a cylinder temperature of 250° C., an injection pressure of 50 MPa, and a mold temperature of 60° C. to obtain an injection molded plate having a length of 150 mm, a width of 100 mm, and a thickness of 4 mm. Then, a test piece having a length of 60 mm, a width of 100 mm and a thickness of 4 mm, and a test piece having a length of 50 mm, a width of 25 mm and a thickness of 4 mm were cut out by a disk saw. Then, the edges were chamfered by #100 sandpaper, and fine burrs were removed by a utility knife, to provide the two large and small plates as test pieces.

The two test pieces were aged in an oven adjusted at 80° C.±5° C. for 300 hours, and cooled at 25° C. for 24 hours, and then the large test piece and the small test piece were mounted in a stick-slip tester SSP-02 manufactured by ZINS Ziegler-Instruments GmbH, and rubbed against each other three times with a swing of 20 mm at a temperature of 23° C., a humidity of 50% RH, a load of 40 N, and a velocity of 10 mm/s. The index under the condition on which the noise risk was largest at this moment was taken as the measured value. The larger the noise risk is, the higher the risk of generation of squeaking sound is. A noise risk of 3 or less is good.

TABLE 1

| Composition | | | Comparative Example 1 | Example 1 | Example 2 | Comparative Example 2 | Example 3 | Example 4 |
|---|---|---|---|---|---|---|---|---|
| Rubber-reinforced aromatic vinyl resins | Raw materials [P] | P1 | 12 | 12 | 12 | 13 | 13 | 13 |
| | | P2 | 24 | 24 | 24 | 20 | 20 | 20 |
| | Raw materials [Q] | Q1 | | 9 | 4 | 4 | 17 | 12 | 12 |
| | | Q2 | 55 | 55 | 55 | 0 | 0 | 0 |

TABLE 1-continued

| Composition | | | Comparative Example 1 | Example 1 | Example 2 | Comparative Example 2 | Example 3 | Example 4 |
|---|---|---|---|---|---|---|---|---|
| Hitting sound-reducing materials | Raw materials [R] | R1 | 0 | 5 | 0 | 0 | 5 | 0 |
| | | R2 | 0 | 0 | 5 | 0 | 0 | 5 |
| Polycarbonate resin | Raw materials [S] | S1 | 0 | 0 | 0 | 50 | 50 | 50 |
| Total (% by mass) | | | 100 | 100 | 100 | 100 | 100 | 100 |
| Bending modulus (MPa) | | | 2400 | 2310 | 2270 | 2210 | 2100 | 2050 |
| Deflection temperature under load (° C.) | | | 91 | 90 | 90 | 96 | 95 | 95 |
| Rockwell hardness | | | 107 | 102 | 103 | 111 | 106 | 106 |
| Tensile strength (MPa) | | | 47 | 47 | 45 | 52 | 51 | 50 |
| Bending strength (MPa) | | | 75 | 72 | 70 | 77 | 75 | 73 |
| Maximum value of measured sound pressure (Pa/N) | | | 4.1 | 1.7 | 1.2 | 3.0 | 1.0 | 0.5 |
| Striking force (N) | | | 21 | 20 | 18 | 19 | 23 | 24 |
| Frequency (Hz) giving maximum sound pressure | | | 8050 | 7750 | 7700 | 8200 | 7950 | 7900 |
| Attenuation of hitting sound (seconds) | | | 0.008 | 0.006 | 0.004 | 0.010 | 0.005 | 0.005 |
| Squeaking sound evaluation | | | 2 | 2 | 2 | 2 | 2 | 2 |

From Table 1, the following are found.

It was found that in Examples 1 to 4 in which the thermoplastic resin composition [X] of the present invention was used, the rigidity was high, and the maximum value of sound pressure within the range of 20 to 20,000 Hz was 2.0 Pa/N or less, and further, the frequency giving the maximum sound pressure was low, the noise risk was low, and thus not only the rigidity but also the acoustic properties such as hitting sound (the attenuation of the hitting sound is preferably shorter than 0.01 seconds, more preferably shorter than 0.008 seconds) and squeaking sound were excellent.

In contrast, in Comparative Examples 1 to 2 in which no hitting sound-reducing material was used, the rigidity was high, and the noise risk was low, but the maximum value of sound pressure within the range of 20 to 20,000 Hz exceeded 2.0 Pa/N, the frequency giving the maximum sound pressure was high, and thus the generation of hitting sound was significant.

INDUSTRIAL APPLICABILITY

The thermoplastic resin composition of the present invention can be preferably applied as a molding material that provides a molded article which is not only highly rigid but also inhibited from the generation of a hitting sound, and can be preferably used, for example, as a molding material for vehicle parts such as automobile interior parts.

The invention claimed is:

1. A thermoplastic resin composition comprising:
   a rubber-reinforced resin (A1), comprising
      a rubbery part (a1) derived from a rubbery polymer, comprising a first portion derived from an ethylene-α-olefin rubbery polymer and a second portion derived from a diene rubbery polymer, and
      a resin part (a2) comprising a structural unit derived from an aromatic vinyl monomer; and
   a thermoplastic elastomer material (B) showing a main dispersion peak of tan δ in a range of −30 to +50° C. or comprising a polymer portion showing a main dispersion peak of tan δ in a range of −30 to +50° C., the thermoplastic elastomer material (B) being substantially free of a polyolefin resin,
   the thermoplastic resin composition comprising 0.1% to 20% by mass of the thermoplastic elastomer material (B) relative to 100% by mass of the thermoplastic resin composition,
   the thermoplastic resin composition formulated to have a bending modulus of 1850 MPa or more as measured according to ISO 178, and a maximum value of sound pressure of 2.0 Pa/N or less as measured by a sound pressure test in a frequency range of 20 to 20,000 Hz.

2. The thermoplastic composition according to claim 1, formulated to have a frequency giving the maximum sound pressure of 8,000 Hz or less as measured by the sound pressure test.

3. The thermoplastic resin composition according to claim 1, formulated to have a noise risk of 3 or less as measured using a stick-slip tester SSP-02.

4. The thermoplastic resin composition according to claim 1, having a rubber content of 5 to 60% by mass.

5. A molded body formed of the thermoplastic resin composition according to claim 1.

6. The thermoplastic resin composition according to claim 1, wherein the thermoplastic elastomer material (B) consists of a styrene-conjugated diene copolymer.

7. The thermoplastic resin composition according to claim 6, wherein the thermoplastic elastomer material (B) comprises a high vinyl conjugated diene part.

8. The thermoplastic resin composition according to claim 6, wherein the styrene-conjugated diene copolymer has a high α-olefin content ethylene-α-olefin copolymer part.

9. The thermoplastic resin composition according to claim 1, wherein the thermoplastic elastomer material (B) consists of a styrene-isoprene-styrene block copolymer.

10. The thermoplastic resin composition according to claim 1, wherein the ethylene-α-olefin rubbery polymer of the first portion of the rubbery part (a1) has crystallinity.

11. The thermoplastic resin composition according to claim 1, wherein the thermoplastic resin composition consists essentially of the rubber-reinforced resin (A1) and the thermoplastic elastomer material (B).

12. The thermoplastic resin composition according to claim 1, wherein the thermoplastic resin composition consists essentially of:

the rubber-reinforced resin (A1);

the thermoplastic elastomer material (B); and an additive selected from the group consisting of slidability-imparting agents, antioxidants, ultraviolet absorbents, weather-resistant agents, anti-aging agents, fillers, antistatic agents, flame retardants, antifogging agents, lubricants, antimicrobial agents, fungicides, tackifiers, plasticizers, colorants, graphite, carbon black, carbon nanotubes, and pigments.

13. The thermoplastic resin composition according to claim 1, wherein the thermoplastic resin composition is substantially free of an additional polyolefin resin component.

14. The thermoplastic resin composition according to claim 1, wherein the thermoplastic resin composition consists essentially of:

the rubber-reinforced resin (A1);

a resin (A2) selected from the group consisting of polycarbonate resins, polyamide resins, polyester resins, vinyl chloride resins, silicone resins and polylactic acid resins; and the thermoplastic elastomer material (B).

15. The thermoplastic resin composition according to claim 1, wherein the thermoplastic resin composition consists essentially of:

the rubber-reinforced resin (A1);

a resin (A2) selected from the group consisting of polycarbonate resins, polyamide resins, polyester resins, vinyl chloride resins, silicone resins and polylactic acid resins;

the thermoplastic elastomer material (B); and an additive selected from the group consisting of slidability-imparting agents, antioxidants, ultraviolet absorbents, weather-resistant agents, anti-aging agents, fillers, antistatic agents, flame retardants, antifogging agents, lubricants, antimicrobial agents, fungicides, tackifiers, plasticizers, colorants, graphite, carbon black, carbon nanotubes, and pigments.

16. The thermoplastic resin composition according to claim 1, wherein the thermoplastic elastomer material (B) consists of a non-hydrogenated styrene-conjugated diene copolymer.

* * * * *